United States Patent [19]

Hughes et al.

[11] Patent Number: 4,687,918

[45] Date of Patent: Aug. 18, 1987

[54] SAFE LASER POINTERS WITH REMOTE DIRECTIONAL ACTIVATION

[75] Inventors: John L. Hughes; John Palmer, both of Canberra, Australia

[73] Assignee: Hughes Technology PTY LTD, Canberra, Australia

[21] Appl. No.: 732,306

[22] Filed: May 9, 1985

[51] Int. Cl.⁴ ............................................. G01J 1/32
[52] U.S. Cl. .................................. 250/205; 455/603; 219/121 LA
[58] Field of Search ............... 219/121 LA, 121 LB; 340/811; 250/205, 215, 216; 455/603, 609, 611, 617; 315/156–159

[56] References Cited

U.S. PATENT DOCUMENTS

| | | | |
|---|---|---|---|
| 4,104,617 | 8/1978 | Bean et al. | 455/603 |
| 4,158,132 | 6/1979 | O'Dell | 250/205 |
| 4,588,885 | 5/1986 | Lovoi et al. | 219/121 LB |

*Primary Examiner*—David C. Nelms

*Attorney, Agent, or Firm*—Cushman, Darby & Cushman

[57] ABSTRACT

The invention relates to a system for pointing out aspects of images projected onto a viewing screen during a lecture, consisting of a laser beam generator held by the lecturer, a power supply to excite the said laser beam generator, a series of incoherent optical transmitters attached around the periphery of said viewing screen and optical detectors embedded in the tip of the said laser beam generator which respond to the light emitted by said series of optical transmitters on the viewing screen. The invention is only activated when the said laser beam generator is directed at the viewing screen because there has to be a direct line of sight between the optical transmitters attached to the periphery of the viewing screen and the detectors embedded in the tip of the laser beam generator for the laser beam to be generated. If this line of sight is broken, as would be the case if the laser beam generator was accidentally directed towards the audience and away from the viewing screen, the laser beam is automatically switched off.

7 Claims, 7 Drawing Figures

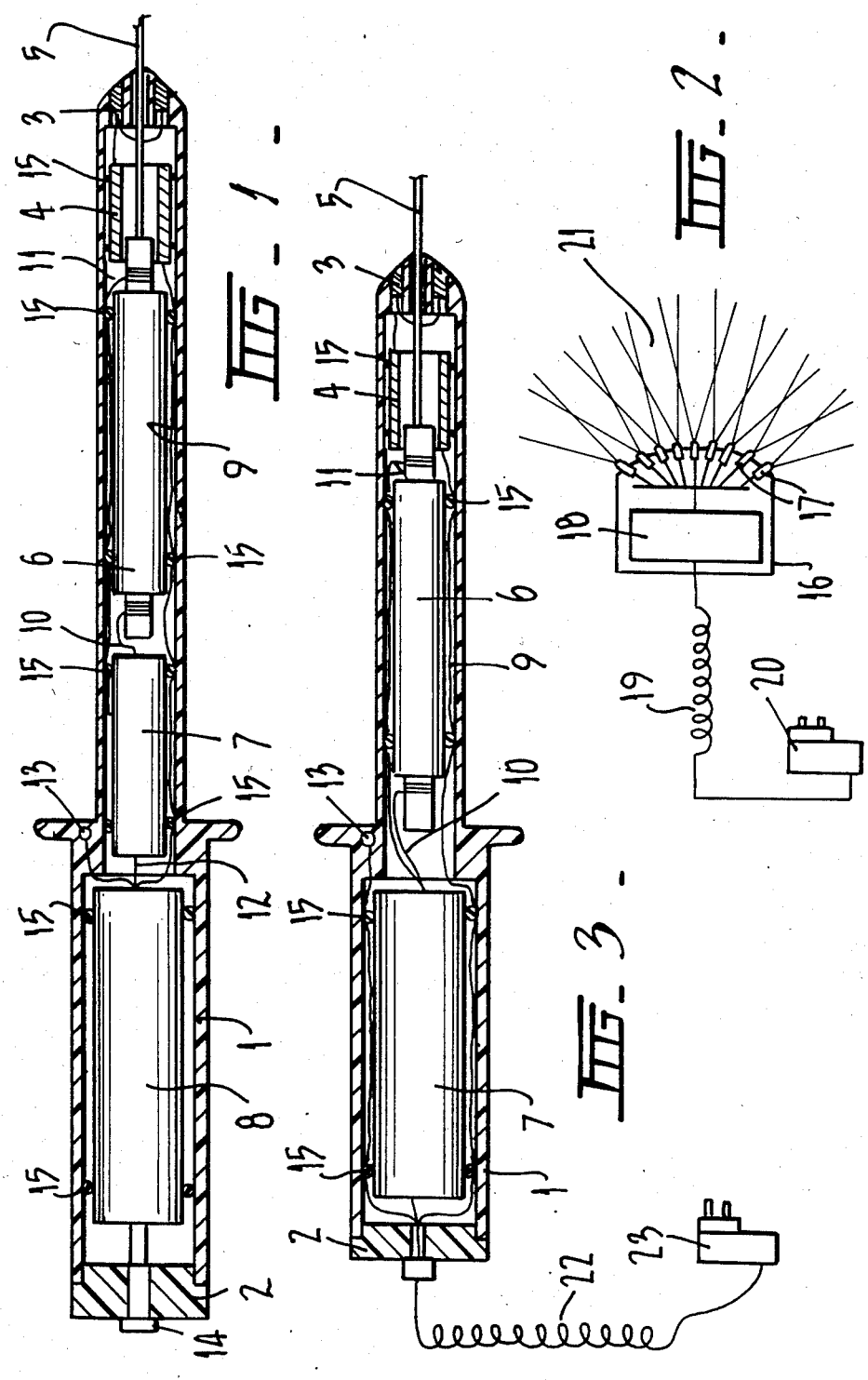

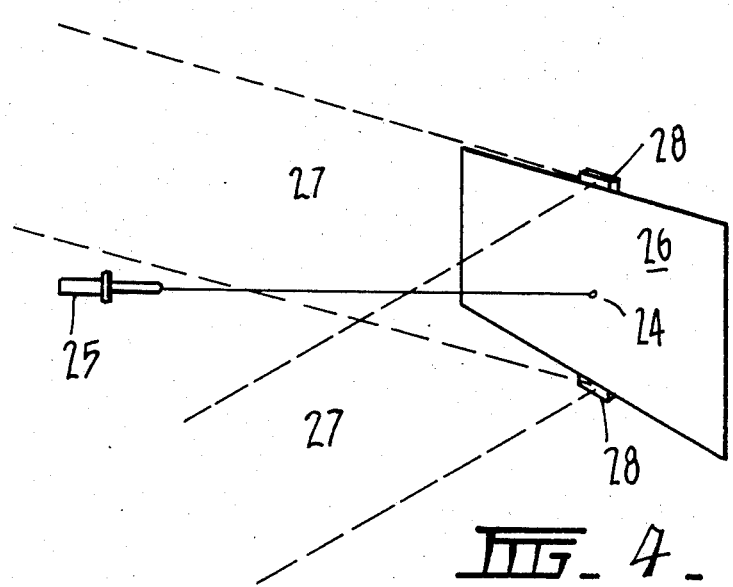
FIG_4_
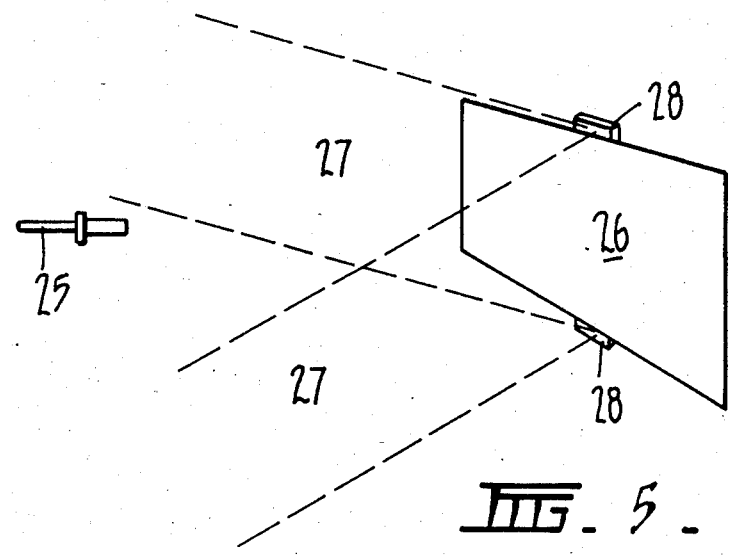
FIG_5_

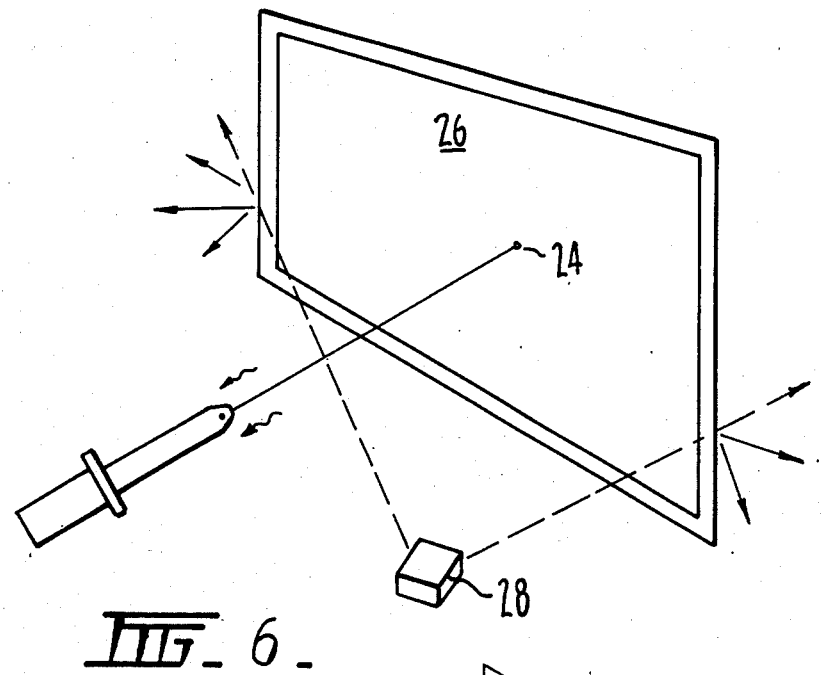
FIG_6_
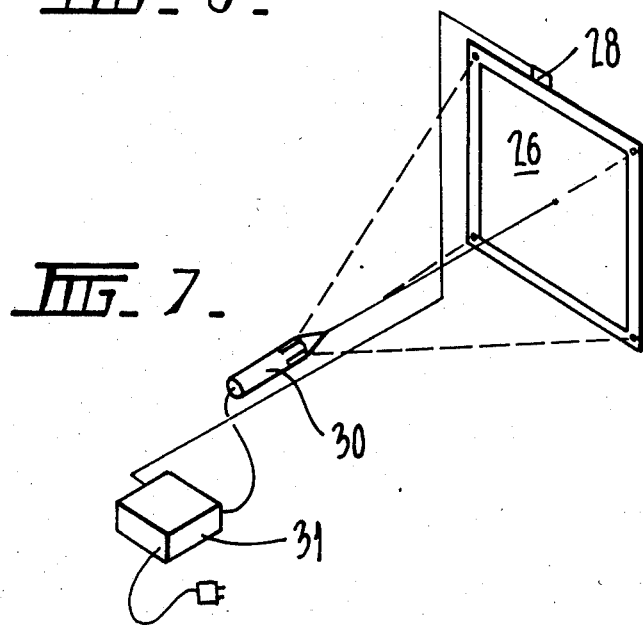
FIG_7_

SAFE LASER POINTERS WITH REMOTE DIRECTIONAL ACTIVATION

DESCRIPTION OF THE PRIOR ART

Prior art laser pointers have proved ideal as lecture pointers because the red spot generated on the viewing screen by the well known helium-neon laser for example, allows the highlights of projected images of slides to be easily identified in the lecture theatre. These prior art laser pointers have outputs of less than one milliwatts placing them in Class II of the international safety classifications. Such Class II laser pointer systems are considered harmless to the naked eye for direct occular exposure of less than one quarter of a second. In operation, if a Class II laser is accidentally directed into the eye of a member of the audience, the reflex action of the eyelid in closing is sufficient to reduce exposure to within the safety limits.

However, if, for any reason, the persons' eyelid failed to close in the required one quarter second time interval, and the whole laser beam entered via a 7 millimeter dilated pupil, then there is a possibility that the eye could suffer damage, for example, retinal damage and the onset of cataracts. To completely avoid such uncertainties, one has to ensure that the laser pointer beam never enters the eye of either the lecturer or any member of the audience. Prior art laser pointer systems are unable to operate in a mode whereby no laser light irradiates the lecturer or a member of the audience. On the other hand, the present invention is designed specifically to avoid such problems.

BACKGROUND OF THE INVENTION

From time immemorial, lecturers have used pointers to highlight topics under discussion. With the advent of the laser in 1960, a pencil thin beam of light became available of sufficient intensity to highlight any presentation, in fact it was the very intense nature of the spot on the screen that presented a health hazard because such coherent beam could cause irreparable damage to the eye. To date, helium-neon lasers of one milliwatts or less have been used by lecturers to highlight their presentations. Unfortunately, lecturers tend to become engrossed in their presentations and the laser beam is sprayed all over the audience as well as the screen, causing considerable discomfort to any member of the audience whose eye happens to be directly in the said laser beam.

In the present invention the laser beam is only emitted when the laser beam generator is directed towards the screen because it is activated by the incoherent light transmitted by small transmitters placed around said screen. A problem exists however, when the lecture theatre has fluorescence tubes which operate at for example 100 cycles per second. This repetitive pulsing of the theatre lights, can interfere with the operation of the present invention if the intensity is high enough because the transmitters placed around the screen to activate the laser beam generator also emit a sequence of light pulses. To avoid interference, the incoherent light transmitters used to activate the laser beam generator is operated at relatively high pulsed light frequencies, for example 40,000 cycles per second and the pulse emission is timed such that they occur when the fluorescent tube emission is at a minimum. In this way the possibility of the laser beam generator being falsely triggered is minimised if not eliminated altogether under normal theatre operating conditions. Strong, continuous light sources also have minimal effects on the false triggering of the laser beam generator due to the high frequency pulsed operation of the incoherent light pulsers and detection systems used on the pointer of the present invention.

In addition to the direct line of operation between the incoherent light transmitters and the detector on the laser beam generator the invention can also operate by having the incoherent optical transmitter directing its output onto the screen and the detectors on the laser beam generator picking up the incoherent light scattered off the said screen. Our invention can also operate with the incoherent optical transmitters embedded in the head of the laser beam generator and the detectors either placed around the edge of the viewing screen for direct detection of the transmitted radiation, or in front of, and facing said screen for activation via light reflected off said screen. However, switching by reflected light other than off the said screen must be eliminated because it could give rise to false triggering of the laser beam generator.

The optimum operation of the present invention is achieved when the number of cables are minimised and the laser beam generator becomes a stand alone system with its own internal battery pack which can operate the laser tube for a minimum of one hour continuously or for a much longer time if the operation is intermittent. This means that only the optical transmitters on the screen are connected to the electrical mains, the connecting lead being well out of the way of either the lecturer or any member of the audience.

SUMMARY OF THE INVENTION

It is an object of the present invention to provide eye safe laser beam highlighting of a lecturers' presentation on a screen by ensuring that the laser beam generator which is pointing towards said screen is activated only in this configuration and is switched off automatically when said laser beam generator is turned towards the audience. Another object of the invention is to provide a laser pointer which operates under safe conditions when the ambient light in the lecture theatre is excessive, that is when the lecturer switches on the room lights between his presentations on the screen.

A further object of the invention is to provide the brightest possible laser spot on the screen of a large lecture theatre so that the members of the audience at the rear of said theatre can have a clear understanding of the presentation.

A still further object of the invention is to ensure that when the laser spot on the screen is bright, no laser light can be directed at the audience.

Another object of the invention is to provide a wide angular coverage of the screen when the laser beam generator is very near to the said screen via the optical transmitters directing their output onto the said screen and the optical detectors on said laser beam generators being activated via both direct and reflected signals from the transmitters.

The hand-held portion of the invention contains the laser beam generator, for example a compact helium-neon laser tube, its high voltage, switched mode power supply, a battery pack to provide a one hour operation period, an optical detector embedded in the tip of the said hand-held portion of the invention, an amplifier to boost the level of the electrical signal from said optical detector, shielded cables to pass the amplifier output signal to the laser tube power supply to switch it on and off and an impact resistant casing of metal or plastic which is in two detachable parts, the narrow diameter front end containing the detector, amplifier module, laser tube and power supply whilst the rear, larger diameter handle portion contains the detachable battery pack and connector for recharging the said battery pack. With the mains operated version of the invention, the hand-held portion does not have a battery pack but rather a mains pack which is connected directly to the mains with a low voltage output lead going to the hand-held portion of the invention which is then much more compact but at the cost of being lead connected to the mains via the said power pack.

It should be noted that a portion of the casing is of such a cross-section as to minimise the rolling of the hand-held portion of the invention down an incline plane such as could be used by the lecturer to display his notes during the lecture. It is also advantageous to have a small light source inserted inside the body of the hand-held portion of the invention so that a faint glow can be seen by the lecturer allowing easy location of the invention in a darkened lecture theatre. However, the energy consumed to generate such a locating light whilst of no consequence in the mains powered model, must be minimal in the battery powered model otherwise it detracts from the operating time between battery recharging.

The incoherent optical transmitter attached to the periphery, or placed in front of the screen consists of one or more light emitting diodes, preferably emitting in the infra red and out of the visible range to avoid audience distraction, the light emitting diode power supply all of which are enclosed in a plastic or metal box, which, if mains powered, is attached to a mains power pack which is fixed directly into the mains socket.

The output beam width of the emitted, incoherent light is several degrees and can be increased by arranging the transmitting diodes on a curved surface. The transmitted, incoherent light beam width must have adequate dimensions to ensure that the laser pointer is activated but not too wide as to waste light particularly by scattering it off the walls of the lecture theatre. When the distance from the screen to the lecturer is over five metres, in general only one of the incoherent optical transmitters is required for the operation of the invention. However, if the lecturer is within five metres of the screen, then the transmitter should be placed so that part or the whole of its light output is reflected off the screen, or more than one transmitter should be mounted around said screen.

BRIEF DESCRIPTION OF THE SEVERAL VIEW OF THE DRAWINGS

A better understanding of the invention will be gained from the following description taken in conjunction with the accompanying drawings. It is emphasised that the ensuing teachings are exemplary and not limitative of the scope and applicability of the invention.

In the drawings:

FIG. 1 is a schematic layout of a preferred hand-held portion of the laser pointer system with the detachable, hand-held portion of the casing containing the rechargeable battery pack, the anti-roll central portion of the said casing, the optical detectors embedded in the tip of the casing, the signal amplifier, the laser tube, its power supply and inter-connecting cables.

FIG. 2 is a schematic layout of a preferred system for transmitting the incoherent optical signals to activate the hand-held portion of the invention consisting of a light emitting diode array, its power supply and a lead connecting it to a mains pack.

FIG. 3 is a schematic layout of the mains operated version of the hand-held portion of the invention.

FIG. 4 is a schematic layout showing the invention operative with the hand-held laser beam generator directing a laser beam away from the audience and onto the screen around which the incoherent optical transmitters have been positioned.

FIG. 5 is a schematic layout of the invention deactivated with the line of sight between the screen transmitters and the laser beam generator broken by turning the said hand-held laser beam generator towards the audience.

In FIG. 6 the incoherent optical transmitter is placed facing the screen to activate the hand-held laser being generated via reflected light.

FIG. 7 is a schematic layout of the invention with the coded optical transmitters in the hand-held unit at the optical detecting position near the screen.

DETAILED DESCRIPTION

In FIG. 1 numeral 1 indicates the casing of the hand-held portion of the invention, numeral 2 the detachable portion through which end the battery is removed, portion 1 being made of two halves of moulded impact resistant plastic in a preferred format, one of the said halves being used as an assembly cradle to mount the optical detector indicated by numeral 3 which is then attached to the signal amplifier module indicated by numeral 4 which has a central aperture to allow the passage of the laser beam indicated by numeral 5 and emitted by a laser tube indicated by numeral 6 which in turn is excited via a power supply indicated by numeral 7, which in turn is connected to a battery pack indicated by numeral 8. Shielded lead indicated by numeral 9 connect signal amplifier 4 to power supply 7 whilst high voltage leads indicated by numeral 10 connect the power supply 7 to laser tube cathode whilst high voltage lead indicated by numeral 11 connects power supply 7 to laser tube anode. Numeral 12 indicates the lead connecting the battery pack 8 to power supply 7 whilst numeral 13 indicates the light source which illuminates the body of the hand-held portion of the invention so that it can be located in a darkened lecture theatre. Numeral 14 indicates the connecting terminal for recharging the battery pack 8. All components are mounted using "0" rings indicated by numeral 15 for ease of assembly and accurate alignment within the casing 1. Once the bottom half of casing 1 has been assembled, the mirror image top half is glued on and end 2 attached to complete the hand-held portion of the invention.

In FIG. 2 numeral 16 indicates the casing for the incoherent optical transmitters, numeral 17 indicates the light emitting diode array, numeral 18 the power supply to distribute power to the array 17 in a programmable pulse sequence, numeral 19 indicates the connecting lead to mains power pack indicated by numeral 20. The output light pattern indicated by numeral 21 provides multiple beams from diode array 17 to activate the hand-held portion of the invention described in FIG. 2. In FIG. 3 numeral 22 indicates the low voltage lead to mains power pack indicated by numeral 23. All other components are as in FIG. 1 except that the 8 has been removed and casing 1 reduced in size due to the elimination of battery pack 8.

FIG. 4 numeral 24 indicates the laser spot generated by laser beam 5 generated by laser generator indicated by numeral 25 on the screen indicated by numeral 26. Laser generator 25 is activated via light beams indicated by numeral 27 emitted by transmitters located around screen 26 indicated by numeral 28.

In FIG. 5 laser beam generator 25 points away from screen 26 towards the audience and is de-activated.

In FIG. 6 transmitter 28 is placed facing screen 26 and laser generator 25 is activated by light indicated by numeral 29 reflected off screen 26.

In FIG. 7 transmitters 30 are placed in the laser beam generator aimed at the detectors near the screen.

A particular use of the present invention is to highlight a lecturers' presentation on a screen, highlighting details of artworks in an art gallery, highlighting objects of interest in museums, pointing out details of equipments and installations in hazardous environments and in applications where the eyes of the audience have to be protected when laser beams are used.

Fluorescent lamps commonly used in lecture theatres emit strongly in the near infra-red region of the electromagnetic spectrum, falling within the spectral response range of silicon and gallium-arsenide photo-detectors of the type used on the hand-held unit of the invention. In order to avoid interference or possible saturation in the said optical detectors of the transmitted pulses, each pulse is emitted from the transmitter unit close to a zero of the mains frequency sine wave. It should be noted that the infrared emissions from the fluorescent lamps closely follow the phase of the mains frequency. The transmitter emissions are also coded with a high audio frequency signal for increased discrimination at the receiver on the hand-held unit. On the other hand, incandescent emissions that are generated in a lecture theatre are relatively broadband, relatively weak compared to the pulsed emissions and form a steady background that can be subtracted from the received light pulse in the hand-held unit.

The amplifier module in the hand-held unit controls the current from the power supply to the laser tube using a time-out circuit that is continually retriggered in the presence of the received pulse from the transmitter unit near the screen. The time-out has hysterisis to avoid the indeterminate state at the edge of the transmitted light field which would otherwise continuously ignite and extinguish the laser tube when the hand-held unit was positioned at this light field boundary causing an unpleasant flickering beam to be emitted from the laser beam generator.

By characterising the hand-held unit amplifier module with a level hysterisis and coupling this with the time-out hysterisis, the repetitive triggering of the laser beam generated at the field edge is eliminated.

Modifications may be made within the above-described matter without departing from the spirit and scope of the invention.

We claim:

1. A directionally activated, audience safe laser pointer system for highlighting aspects of a lecturer's presentation on a screen, said system comprising:
    (a) an incoherent optical transmitter unit for mounting adjacent the screen including a curved base member, an array of pilsed light emitting diodes mounted on said curved base member for producing an optical output, a mains operated pulsed power supply coupled to said diodes and a power point unit coupled to said power supply and adapted to be plugged directly into a main socket, said pulsed power supply exciting said light emitting diode array over selected portions of the mains frequency cycle; and
    (b) a hand-held laser beam generator/transmitter unit including an optical detector disposed in a forward end of said generator/transmitter unit for receiving said optical output from said optical transmitter unit and converting said output into an electrical signal, a hollow cylindrical electrical signal amplifier for amplifying said electrical signal and mounted rearwardly of said detector, a shielded electrical cable for conducting the amplified electrical signal from said signal amplifier, a switch-mode laser power supply which is activated and deactivated in accordance with said amplified electrical signal from said cable, and a laser beam generator coupled to said laser power supply and disposed between said power supply and said amplifier, said laser beam generator generating a laser beam which propagates through said signal amplifier when said laser power supply is activated, whereby an output in the form of incoherent light transmitted from said transmitter unit activates said hand-held laser beam generator/transmitter unit to generate a laser beam which impinges on the screen, said laser beam being extinguished when said hand-held unit is turned away from said screen.

2. A safe laser pointer system as claimed in claim 1, wherein said switch-mode laser power supply is operatively coupled to a power storing means.

3. A safe laser pointer system as claimed in claim 1, wherein said incoherent optical transmitter unit generates an output which illumnates said screeen with pulses of light which are reflected by said screen and activate said hand-held unit.

4. A safe laser pointer system as claimed in claim 1, wherein said selected portions of the mains frequency cycle comprise portions of the mains frequency cycle during which pulsed room lighting is deactivated.

5. A safe laser pointer system as claimed in claim 1, wherein said output from said optical transmitter unit comprises high frequency pulses so that said hand-held unit can discriminate between said pulses and a continuously operated light source whereby said hand-held unit will not be activated by the continuously operated light source.

6. A safe laser pointer system as claimed in claim 1, wherein said laser beam from said hand-held unit has an intensity such that a spot is generated on the screen which is clearly visible from the rear of a large lecture theater.

7. A safe laser pointer hand-held unit comprising:
    an optical detector which generates a signal in accordance with an incident activation signal;
    a switched-mode power supply operatively coupled to said optical detector for receiving said optical detector signal; and
    a laser beam generator coupled to said power supply which transmits a visible laser beam in the direction of said incident activation signal in response to the receipt by said power supply of an optical detector signal.

* * * * *